US012798501B2

(12) United States Patent
Moellmann et al.

(10) Patent No.: US 12,798,501 B2
(45) Date of Patent: Nov. 17, 2026

(54) ELECTRIC COUPLING ARRANGEMENT FOR WIRELESS SIGNAL TRANSMISSION IN THE AREA OF A HOLLOW MACHINE PART

(71) Applicant: Schaeffler Technologies AG & Co. KG, Herzogenaurach (DE)

(72) Inventors: Andreas Moellmann, Furth (DE); Dominik Etges, Aachen (DE); Dirk Bleckmann, Werdohl (DE); Artem Cerkasov, Meinerzhagen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 387 days.

(21) Appl. No.: 18/291,269

(22) PCT Filed: Jun. 22, 2022

(86) PCT No.: PCT/DE2022/100456

§ 371 (c)(1),
(2) Date: Jan. 23, 2024

(87) PCT Pub. No.: WO2023/001326

PCT Pub. Date: Jan. 26, 2023

(65) Prior Publication Data

US 2024/0326725 A1 Oct. 3, 2024

(30) Foreign Application Priority Data

Jul. 23, 2021 (DE) .......................... 102021119115.7

(51) Int. Cl.
*H01P 5/103* (2006.01)
*B60R 16/023* (2006.01)

(52) U.S. Cl.
CPC .......... *B60R 16/0231* (2013.01); *H01P 5/103* (2013.01)

(58) Field of Classification Search
CPC .... H02J 50/10; H02J 50/80; H02J 7/70; H02J 50/12; H02J 7/47; H02J 50/90;
(Continued)

(56) References Cited

U.S. PATENT DOCUMENTS

2004/0012253 A1* 1/2004 Stephane ............. B60G 17/019
303/114.3
2011/0298566 A1* 12/2011 Yassini .................. H01P 1/208
333/202
(Continued)

FOREIGN PATENT DOCUMENTS

CN 111699364 A 9/2020
DE 102004018370 A1 11/2005
(Continued)

*Primary Examiner* — John W Poos
(74) *Attorney, Agent, or Firm* — Volpe Koenig

(57) ABSTRACT

An electric coupling arrangement for wireless signal transmission in the area of a cavity in an at least partially hollow machine part, including a hollow-cylindrical coupling element at a transmitter end which is fit into the cavity, is connected to a sensor located in or on the machine part and communicates with a pin-type coupling element at a receiver end via a transmission path inside the cavity, the pin-type coupling element at least partially projecting into the hollow-cylindrical portion, located in the cavity, of the coupling element at the transmitter end.

16 Claims, 2 Drawing Sheets

(58) Field of Classification Search

CPC .... H02J 50/40; H02J 50/20; H02J 7/42; H02J 7/731; H02J 50/60; H02J 50/402; H02J 50/70; H02J 2105/46; H02J 50/005; H02J 50/27; H02J 50/23; H02J 2105/33; H02J 2105/44; H02J 50/50; H02J 7/35; H02J 7/50; H02J 7/61; H02J 7/685; H02J 7/751; H02J 7/90; H02J 13/1331; H02J 13/1333; H02J 13/14; H02J 2105/42; H02J 50/05; H02J 7/00; H02J 7/02; H02J 7/933; H02J 9/005; H02J 9/007; H02J 9/065; H01P 5/103; H01P 3/10; H01P 5/08; H01P 7/065; H01P 1/165; H01P 3/06; H01P 7/04; H01P 7/06; H01P 7/10; H01P 5/02; H01P 5/12; H01P 1/205; H01P 1/2053; H01P 1/2084; H01P 11/00; H01P 1/047; H01P 1/161; H01P 1/20327; H01P 1/20336; H01P 1/208; H01P 3/08; H01P 3/082; H01P 5/16; H01P 5/183; H01P 7/082; H01P 1/122; H01P 1/207; H01P 1/2133; H01P 1/219; H01P 1/38; H01P 1/387; H01P 5/04; H01P 5/107; F04C 2230/60; H03H 9/0207; H03H 9/02228; H03H 9/14552; H03H 9/178; H03H 9/585; H03H 9/02685; H03H 9/0038; H03H 9/0057; H03H 9/02015; H03H 9/02086; H03H 9/02102; H03H 9/02118; H03H 9/02543; H03H 9/02551; H03H 9/02559; H03H 9/02637; H03H 9/02661; H03H 9/02937; H03H 9/145; H03H 9/14588; H03H 9/173; H03H 9/175; H03H 9/25; H03H 9/54; H03H 9/6433; H03H 9/6436; H03H 9/6463; H01Q 1/38; H01Q 1/48; H01Q 13/18; H01Q 13/10; H01Q 9/04; H01Q 1/273; H01Q 21/064; H01Q 5/40; H01Q 1/2225; H01Q 1/52; H01Q 13/08; H01Q 9/0414; H01Q 1/44; H01Q 1/523; H01Q 21/065; H01Q 9/42; H01Q 1/50; H01Q 21/245; H01Q 1/36; H01Q 1/1207; H01Q 1/46; H01Q 11/02; H01Q 13/20; H01Q 13/26; H01Q 21/0006; H01Q 21/06; H01Q 21/061; H01Q 21/24; H01Q 21/30; H01Q 5/25; H01Q 9/0421; H01Q 1/1285; H01Q 1/22; H01Q 1/243; H01Q 21/0025; H01Q 21/0037; H01Q 21/0043; H01Q 21/005; H01Q 21/0075; H01Q 21/0087; H01Q 9/0407; H01Q 1/04; H01Q 1/08; H01Q 1/1271; H01Q 1/20; H01Q 1/247; H01Q 1/362; H01Q 11/083; H01Q 13/0241; H01Q 13/0275; H01Q 13/103; H01Q 13/203; H01Q 13/206; H01Q 15/14; H01Q 19/108; H01Q 9/0471; H01Q 9/26; H01Q 9/265; H01Q 9/27; H01Q 1/007; H01Q 1/1221; H01Q 1/2216; H01Q 1/2283; H01Q 1/32; H01Q 1/521; H01Q 13/106; H01Q 15/24; H01Q 19/185; H01Q 21/08; H01Q 21/28; H01Q 21/29; H01Q 21/293; H01Q 23/00; H01Q 3/267; H01Q 9/0428

See application file for complete search history.

(56) References Cited

U.S. PATENT DOCUMENTS

| | | | | |
|---|---|---|---|---|
| 2017/0373766 | A1* | 12/2017 | Lee | F04B 53/144 |
| 2021/0017979 | A1* | 1/2021 | Iannotti | H04B 5/73 |

FOREIGN PATENT DOCUMENTS

| | | | |
|---|---|---|---|
| DE | 102011003703 | A1 | 8/2012 |
| DE | 102013100979 | B3 | 5/2014 |
| DE | 102014200639 | A1 | 7/2015 |
| DE | 102014112116 | A1 | 2/2016 |
| EP | 3044735 | B1 | 3/2020 |
| JP | S60144197 | U | 9/1985 |
| JP | S6181394 | U | 5/1986 |
| JP | H0466695 | U | 6/1992 |
| JP | H0659997 | U | 8/1994 |
| JP | 2007256008 | A | 10/2007 |
| JP | 2010167557 | A | 8/2010 |
| JP | 2011517913 | A | 6/2011 |
| KR | 20060003762 | A | 1/2006 |
| WO | 2021004568 | A1 | 1/2021 |

* cited by examiner

ELECTRIC COUPLING ARRANGEMENT FOR WIRELESS SIGNAL TRANSMISSION IN THE AREA OF A HOLLOW MACHINE PART

CROSS-REFERENCE TO RELATED APPLICATIONS

This application is the U.S. National Phase of PCT Appln. No. PCT/DE2022/100456, filed Jun. 22, 2022, which claims the benefit of German Patent Appln. No. 102021119115.7, filed Jul. 23, 2021, the entire disclosures of which are incorporated by reference herein.

TECHNICAL FIELD

The present disclosure relates to an electric coupling arrangement for wireless signal transmission in the area of machine parts, preferably a transmission or electric motor.

BACKGROUND

The field of application of the disclosure extends primarily to automotive engineering. In hybrid or electric vehicles in particular, drive train components such as electric motors, transmissions and transmission shafts are usually subjected to sensor-based condition monitoring. For this purpose, condition monitoring sensors are used in the area of gears, bearings, couplings and the like, which primarily measure the component temperature, but also vibrations, voltages, torques, accelerations, angles, speeds, magnetic field strengths and the like, in order to make them available to a, usually external, electronic evaluation unit for signal evaluation and/or a transmitter and/or receiver unit, such as a reader, for example as part of a so-called condition monitoring system or as control parameters for control processes.

The signal transmission between the sensors and the electronic evaluation unit can be conducted using wires in an interference-proof manner, provided that signal transmission does not take place between components that are moving relative to one another, in particular rotating components. Although electrical contact rotary feedthrough units do exist, they are quite susceptible to faults and require maintenance due to the mechanical sliding contact principle. The present disclosure, on the other hand, is devoted to the subject of wireless signal transmission, which can be implemented, for example, via radio, infrared or the like. In addition, the solution according to the disclosure can also be used in other drive trains, for example in wind turbines.

DE 10 2014 200 639 A1 describes a system for determining the condition data of a transmission, in particular a planetary transmission, comprising at least one passive RFID sensor unit with a sensor and an RFID reader. It is only generally proposed here that the RFID reader is arranged on a first transmission part and the RFID sensor unit is arranged on a second transmission part, which is movable relative to the first transmission part. Wireless signal transmission of this kind requires an interference-free radio link that cannot be impaired by adjacent components or external influences.

WO 2021 004568 A1 discloses an electric drive machine, transmission, combustion engine and combinations thereof, which are equipped with several condition monitoring sensors to form a sensor network. The sensors of the sensor network are preferably arranged at different positions in the machine and are each designed to measure a physical variable. For this purpose, the individual sensors are each electrically connected wirelessly to an electronic evaluation unit, which processes the signals received wirelessly from the sensors. When planning the arrangement of the sensors, care must also be taken here to ensure uninterrupted radio links.

In practice, however, it is not always possible to integrate the condition monitoring sensors into the machine in such a way that uninterrupted wireless signal transmission can be guaranteed, in particular between machine parts that rotate relative to one another and from deep, difficult-to-access machine structures.

It is therefore the object of the present disclosure to create an electric coupling arrangement for wireless signal transmission in the area of machine parts, which ensures reliable forwarding of sensor signals to an external electronic evaluation unit using simple technical means.

SUMMARY

The object is achieved by an electric coupling arrangement according to claim 1. Claim 10 specifies a transmission or an electric motor with an electric coupling arrangement according to the disclosure as a preferred application. The dependent claims are directed at advantageous further developments of the disclosure.

The disclosure incorporates the technical teaching that an electric coupling arrangement for wireless signal transmission in the area of a cavity in an at least partially hollow machine part comprises a hollow-cylindrical coupling element at the transmitter end which is fit into the cavity, is connected to a sensor arranged in or on the machine part and communicates via a transmission path, in particular an air path or oil as dielectric, with a pin-type coupling element at the receiver end, which projects at least partially into the hollow-cylindrical portion, arranged in the cavity, of the coupling element at the transmitter end. In this context, the solution according to the disclosure also includes an exchange of the transmitter and receiver end. Preferably, the sensor emits a signal which is transmitted to the transmitter/receiver unit/evaluation unit via the coupling elements.

In other words, the solution according to the disclosure thus refers to an electric coupling arrangement for wireless signal transmission, in which the signal is transmitted inside an at least partially hollow machine part. In this regard, the sensor signals of several sensors arranged on the machine part can be acquired via a coupling element projecting into the cavity. Several sensors can also be connected to one coupling element. The solution according to the disclosure is therefore particularly suitable for acquiring sensor signals on rotating components.

In a particularly advantageous way, the solution according to the disclosure can thus be used for the wireless detection of, for example, the rotor temperature of a traction motor. If the temperatures in the rotor are too high, the magnets will demagnetize and thus damage the electric motor. For this reason, a more expensive magnetic material has so far been used to counteract such a demagnetization tendency.

With the solution according to the disclosure, however, the temperature can be measured directly at the magnets and the maximum permitted temperature can be precisely controlled. Another benefit with regard to determining the rotor temperature is the calculation of the torque of the electric motor. The torque of the electric motor is usually determined via characteristic diagrams in which the rotor temperature is an important influencing variable. By means of the rotor temperature, which can be measured with a wireless temperature sensor, the torque can be calculated more accurately. It is also possible to monitor the temperature of temperature-critical transmission components, in particular bearings, and cool them as required. As a result, this reduces the oil requirement and thus also the splashing losses usually associated with pressure oil lubrication.

The solution according to the disclosure makes it possible, for example, to integrate many temperature sensors at any point of an electric motor or a transmission with little effort by way of implementing a sensor network, and to detect their measured values via a central electronic evaluation unit and process them in an application-specific manner. This allows for an optimal system control to be achieved.

According to a preferred embodiment of the disclosure, the hollow-cylindrical coupling element at the transmitter end is designed to be tubular or sleeve-shaped. This element can be prefabricated and inserted into the likewise preferably cylindrical cavity of the machine part with an inner wall contact and attached to it, for example by gluing. It should be noted that an insulating layer is required between the hollow-cylindrical coupling element, which is preferably made of a metal, for example copper, and the inner wall of the machine part, which is usually also made of an electrically conductive material, preferably steel, and which can be made of an electrically non-conductive plastic, for example. The insulating layer can be part of the prefabricated tubular or sleeve-shaped coupling element or can also be designed as a separate sleeve-shaped element and thus form its outer lateral surface, for example. This allows the hollow-cylindrical coupling element to be fixed in the cavity of the hollow machine part by means of an adhesive connection or similar. In addition to such a materially bonded connection, a force-fitting connection, for example by press-fitting, is also conceivable.

According to a further embodiment of the hollow-cylindrical coupling element at the sensor end, it can also be designed as a film or coating. In the case of a film, it has an electrical insulating layer applied to the outside. The cavity of the machine part can be easily lined with such a multilayer film, wherein adhesive fixing is recommended. In addition, it is also conceivable to first coat a cylindrical cavity of the machine part with an electrically insulating layer, for example a plastic, to which an electrically conductive layer, for example made of a metal, is then applied. This can be achieved, for example, by vapor deposition in a vacuum.

In addition, it is also conceivable to form the hollow-cylindrical coupling element from a circuit board material, in particular as a flexible circuit board or a circuit board consisting of several segments would be suitable for this purpose.

According to a further measure improving the disclosure, it is proposed that the hollow-cylindrical coupling element at the transmitter end is arranged coaxially to the pin-type coupling element at the receiver end. This allows for a particularly high signal quality to be achieved and the pin-type coupling element at the receiver end is arranged in a particularly well protected manner within the cavity structure of the machine part. This applies to both mechanical considerations as well as radio communication with respect to interference signals.

For this purpose, it is further proposed that the hollow-cylindrical coupling element at the transmitter end projects frontally beyond the distal end of the pin-type coupling element at the receiver end. Preferably, in the automotive applications of particular interest here, the pin-type coupling element should be 5 to 10 mm shorter than the hollow-cylindrical coupling element.

For a further improvement in signal transmission, it is proposed that the length of the hollow-cylindrical coupling element at the transmitter end and/or of the pin-type coupling element at the receiver end is a multiple of the wavelength of the operating frequency of the wireless signal transmission. This value can, for example, be chosen according to a quarter, half or three quarters of the wavelength.

The pin-type coupling element at the receiver end can be designed as a rod, tube, sleeve or spiral, for example, and can be provided with an electrically non-conductive coating in order to avoid direct electrical contact with the hollow-cylindrical coupling element at the transmitter end, for example as a result of unintentional deformation.

In the case of a tube or sleeve form of the coupling element, it can be arranged on a component connected to the housing. If the housing-connected component is made of a metallic material, the inner surface of the tubular or sleeve-shaped coupling element should be provided with an insulating layer. The insulating layer can be part of the prefabricated tubular or sleeve-shaped coupling element or can also be designed as a separate sleeve-shaped element and thus form its inner lateral surface, for example.

According to a further measure improving the disclosure, it is proposed that a non-magnetic and/or non-electric bearing element surrounding the pin-type coupling element at the receiver end and supporting it with respect to the hollow-cylindrical coupling element can be provided to protect it from unintentional deformation. A simple plastic disc, which is glued into the outer edge of the hollow-cylindrical coupling element and through the central opening of which the pin-type coupling element projects, is sufficient for this purpose.

The wireless signal transmission can be based on SAW or RFID technology as part of the solution according to the disclosure. The ISM bands 13.5 MHz, 433 MHz, 868 MHz, 2.4 GHz or 5 GHz or other standard radio bands, for example the SDR band, are preferably used as the operating frequency.

According to a preferred form of application, the at least partially hollow machine part is a hollow shaft of a gear pair or a drive shaft in a drive train of a motor vehicle or a wind turbine. In this respect, the solution according to the disclosure makes use of the cavity structure of this machine part, which is primarily used for an oil feedthrough, in order to create a mechanically protected and reliable sensor connection in terms of signal transmission.

Preferably, the machine part is rotatably mounted and the coupling element at the reader end is attached to the stationary housing. An energy harvesting module or similar can be provided to supply power to the active sensor.

If the coupling element at the reader end is very thin and long, it can be stiffened or additionally held. It can be arranged inside or outside of the housing.

An electrically decoupling layer or sleeve on the coupling element at the receiver or transmitter end is also advantageous. The dielectric, air or oil, in particular the dielectric constant between the coupling elements, is related to the length of the coupling element. The insulating layer between the coupling element at the transmitter end and the machine component or between the coupling element at the receiver end and the component fixed to the housing can also be a dielectric. This dielectric, or in particular the dielectric constant of the insulating layer, can also be related to the length of the coupling element.

BRIEF DESCRIPTION OF THE DRAWINGS

Further measures to improve the disclosure are illustrated below together with the description of preferred exemplary embodiments of the disclosure using the figures. In the figures.

DETAILED DESCRIPTION

Figure 1:
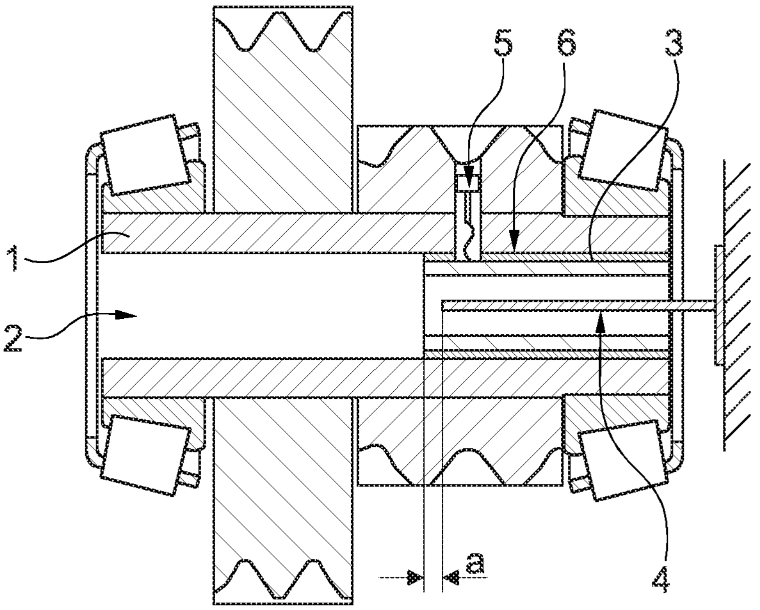
FIG. 1 shows a schematic longitudinal section through a gear pairing arranged on a hollow shaft with a sensor for temperature detection, which is connected via an electric coupling arrangement according to a first exemplary embodiment of the disclosure.

According to FIG. 1, a hollow shaft 1 carrying a gear pair forms a cavity 2 in which a hollow-cylindrical coupling element 3 is accommodated and which interacts with a pin-type coupling element 4 via air as a dielectric to form a wireless signal transmission path.

A sensor 5 for detecting the component temperature is arranged in the gear area outside of the hollow shaft 1, which is electrically connected to the hollow-cylindrical coupling element 3 at the transmitter end via a plastic layer 6 acting as a dielectric. The pin-type coupling element 4 at the receiver end communicating with it projects for the most part into the hollow-cylindrical portion of the coupling element 3 at the transmitter end arranged in the cavity 2. In this regard, the hollow-cylindrical coupling element 3 at the transmitter end projects frontally beyond the distal end of the pin-type coupling element 4 at the receiver end by a length a. The pin-type coupling element 4 is arranged coaxially to the hollow-cylindrical coupling element 3.

In this exemplary embodiment, the pin-type coupling element 4 is designed as a rod consisting of an electrically conductive material.

Figure 2:
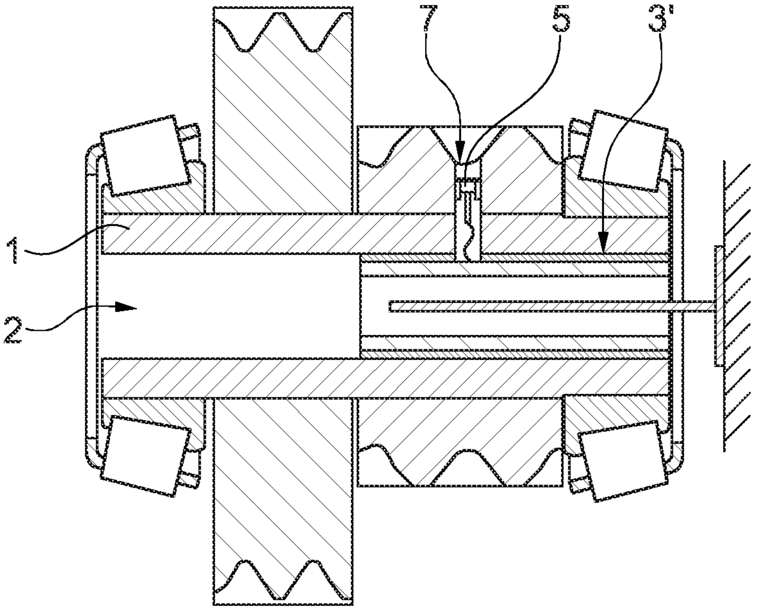
FIG. 2 shows a schematic longitudinal section through a gear pairing arranged on a hollow shaft with a sensor for temperature detection, which is connected via an electric coupling arrangement according to a second exemplary embodiment of the disclosure.

According to FIG. 2, the hollow-cylindrical coupling element 3' at the transmitter end is designed as a film, which is provided with an electrically insulating plastic coating on the outer lateral surface. In addition, the sensor 5 is accommodated in an insulating sensor protection cover 7, via which the sensor 5 is pressed into a corresponding hole in the machine part. Otherwise, this exemplary embodiment corresponds to the exemplary embodiment described above.

Figure 3:
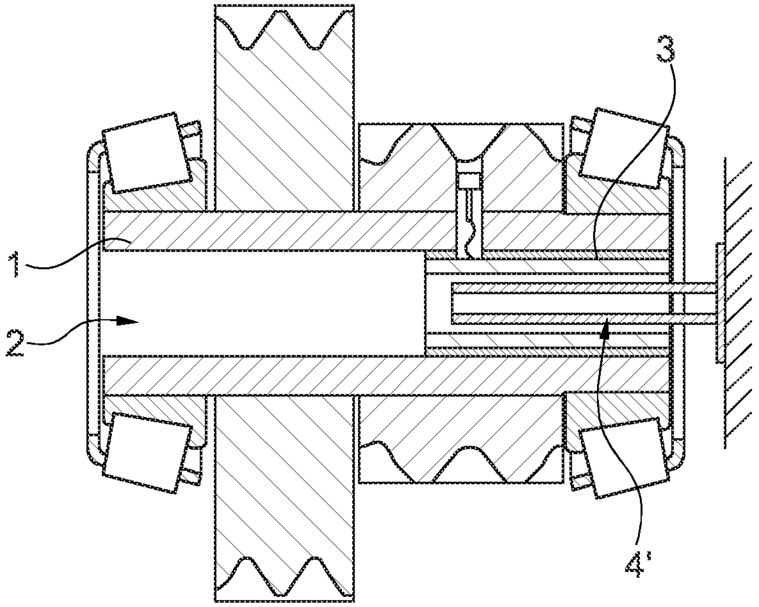
FIG. 3 shows a schematic longitudinal section through a gear pairing arranged on a hollow shaft with a sensor for temperature detection, which is connected via an electric coupling arrangement according to a third exemplary embodiment of the disclosure

In FIG. 3, in contrast to the exemplary embodiment described at the outset, the pin-type coupling element 4' at the receiver end is designed in the form of a tube, so that this pin-type coupling element 4' is provided with a hollow waveguide property for improved signal transmission. Otherwise, this exemplary embodiment also corresponds to the exemplary embodiment described at the outset.

Figure 4:
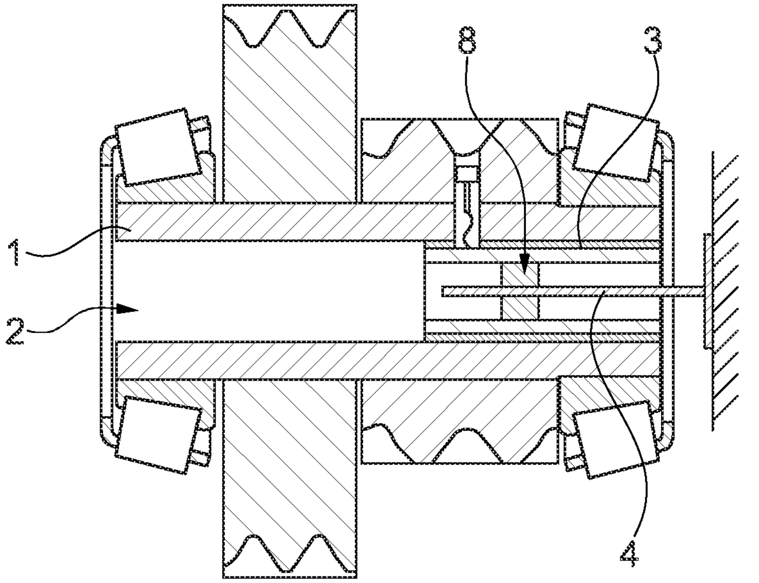
FIG. 4 shows a schematic longitudinal section through a gear pairing arranged on a hollow shaft with a sensor for temperature detection, which is connected via an electric coupling arrangement according to a fourth exemplary embodiment of the disclosure.

According to FIG. 4, a bearing element 8 is arranged in the intermediate area between the pin-type coupling element 4 and the hollow-cylindrical coupling element 3 coaxially surrounding it. The bearing element 8 is made of a non-magnetic and non-electric plastic and serves to support the pin-type coupling element 4, which is quite thin in this exemplary embodiment, in order to ensure its desired position, even when the hollow shaft 1 is rotating rapidly. Otherwise, this exemplary embodiment also corresponds to the exemplary embodiment described at the outset.

The disclosure is not restricted to the preferred exemplary embodiments described in more detail above. Rather, deviations therefrom are also conceivable that are included within the scope of protection of the following claims. For example, it is also possible to use a cavity of another at least partially hollow machine part to accommodate the electric coupling arrangement according to the disclosure instead of a hollow shaft.

LIST OF REFERENCE SYMBOLS

1 Hollow shaft
2 Cavity
3 Hollow-cylindrical coupling element
4 Pin-type coupling element
5 Sensor
6 Dielectric
7 Sensor protection cover
8 Bearing element
a Recessed length

The invention claimed is:

1. An electric coupling for wireless signal transmission in the area of a cavity in an at least partially hollow machine part, comprising:

a hollow-cylindrical coupling element at a transmitter end which is fit into the cavity, is connected to at least one sensor arranged in or on the machine part and communicates with a pin-type coupling element at a receiver end via a transmission path inside the cavity, the pin-type coupling element at least partially projecting into the hollow-cylindrical portion, arranged in the cavity, of the coupling element at the transmitter end;

wherein the pin-type coupling element at the receiver end is supported or electrically decoupled with respect to the machine part by at least one non-magnetic or non-electric bearing element.

2. The electric coupling arrangement according to claim 1, wherein the coupling element at the transmitter end is at least one of tubular or sleeve-shaped.

3. The electric coupling arrangement according to claim 1, wherein the coupling element at the transmitter end is at least one of a film or coating.

4. The electric coupling arrangement according to claim 1, wherein the coupling element at the transmitter end is arranged coaxially to the pin-type coupling element at the receiver end.

5. The electric coupling arrangement according to claim 1, wherein the coupling element at the transmitter end projects frontally beyond a distal end of the coupling element at the receiver end.

6. An electric coupling for wireless signal transmission in the area of a cavity in an at least partially hollow machine part, comprising:

a hollow-cylindrical coupling element at a transmitter end which is fit into the cavity, is connected to at least one sensor arranged in or on the machine part and communicates with a pin-type coupling element at a receiver end via a transmission path inside the cavity, the pin-type coupling element at least partially projecting into the hollow-cylindrical portion, arranged in the cavity, of the coupling element at the transmitter end;

wherein at least one of the hollow-cylindrical coupling element at the transmitter end or the pin-type coupling element at the receiver end has a length that is a multiple of the wavelength of the operating frequency of the signal transmission.

7. The electric coupling arrangement according to claim 1, wherein the pin-type coupling element at the receiver end is configured as a rod, tube, sleeve or spiral.

8. The electric coupling arrangement according to claim 1, wherein the machine part having the cavity comprises a hollow shaft in a drive train of a motor vehicle or a wind turbine.

9. A transmission and/or electric motor of a hybrid or electric vehicle having an electric coupling arrangement for wireless signal transmission in the area of a cavity in an at least partially hollow machine part comprising:

a hollow-cylindrical coupling element at a transmitter end which is fit into the cavity, is connected to at least one sensor arranged in or on the machine part and communicates with a pin-type coupling element at a receiver end via a transmission path inside the cavity, the pin-type coupling element at least partially projecting into the hollow-cylindrical portion, arranged in the cavity, of the coupling element at the transmitter end;

wherein the pin-type coupling element at the receiver end is supported or electrically decoupled with respect to the machine part by at least one non-magnetic or non-electric bearing element.

10. The transmission and/or electric motor of a hybrid or electric vehicle according to claim 9, wherein the coupling element at the transmitter end is at least one of tubular or sleeve-shaped.

11. The transmission and/or electric motor of a hybrid or electric vehicle according to claim 9, wherein the coupling element at the transmitter end is at least one of a film or coating.

12. The transmission and/or electric motor of a hybrid or electric vehicle according to claim 9, wherein the coupling element at the transmitter end is arranged coaxially to the pin-type coupling element at the receiver end.

13. The transmission and/or electric motor of a hybrid or electric vehicle according to claim 9, wherein the coupling element at the transmitter end projects frontally beyond a distal end of the coupling element at the receiver end.

14. The transmission and/or electric motor of a hybrid or electric vehicle according to claim 9, at least one of the hollow-cylindrical coupling element at the transmitter end or the pin-type coupling element at the receiver end has a length that is a multiple of the wavelength of the operating frequency of the signal transmission.

15. The transmission and/or electric motor of a hybrid or electric vehicle according to claim 9, wherein the pin-type coupling element at the receiver end is configured as a rod, tube, sleeve or spiral.

16. The transmission and/or electric motor of a hybrid or electric vehicle according to claim 9, wherein the machine part having the cavity comprises a hollow shaft in a drive train of a motor vehicle or a wind turbine.

* * * * *